Oct. 22, 1957 G. C. MORGAN 2,810,413

LOG-DEBARKER FLEXIBLE TOOL-MOUNTING

Filed Jan. 14, 1955 5 Sheets-Sheet 1

INVENTOR

GEORGE C. MORGAN

BY Munn Liddy Nathanson & March

ATTORNEY

LOG-DEBARKER FLEXIBLE TOOL-MOUNTING

Filed Jan. 14, 1955 5 Sheets-Sheet 2

INVENTOR
GEORGE C. MORGAN

BY
Munn, Liddy, Nuthausen & March
ATTORNEY

INVENTOR
GEORGE C. MORGAN

BY Munn, Liddy, Kitlancer & March
ATTORNEY

INVENTOR
GEORGE C. MORGAN
BY Mann, Liddy, Nathanson & March
ATTORNEYS

Oct. 22, 1957 G. C. MORGAN 2,810,413

LOG-DEBARKER FLEXIBLE TOOL-MOUNTING

Filed Jan. 14, 1955 5 Sheets-Sheet 5

INVENTOR

GEORGE C. MORGAN

BY Munn, Liddy, Nathanson & Marsh

ATTORNEYS

United States Patent Office 2,810,413

Patented Oct. 22, 1957

2,810,413

LOG-DEBARKER FLEXIBLE TOOL-MOUNTING

George C. Morgan, Birmingham, Ala., assignor to Continental Gin Company, Birmingham, Ala., a corporation of Delaware Application January 14, 1955, Serial No. 481,910

11 Claims. (Cl. 144—208)

This invention relates to apparatus for removing bark from logs and in particular to a mounting for log-peeling tools.

In one form of log debarker the bark is removed by a number of knives or peelers positioned radially of the log. The knives are mounted in a ring which rotates around the log. At the same time that the knives are rotating the logs are advanced axially through the machine. Means are provided for advancing or retracting the knives with respect to the log. In one form of the apparatus the knives are associated with pneumatic operators comprising a piston and cylinder. The knives are advanced toward the logs by admitting air into the cylinder.

Logs are in the natural state as they are fed to this machine in that the bark has not been removed and the projections which are naturally formed on the trunks have also not been removed. In addition, in northern climates the logs are often frozen. The tools, as is well known, tend to advance continuously toward the logs due to the application of air pressure as a common means for pressing the tools against the logs. Thus the tools will enter depressions and strike against projections such as knots, etc. Therefore, the tools are subject to heavy loads, and particularly large shock loads. Accordingly, one of the objects of this invention is to provide a tool mounting which will absorb and withstand loads, shocks and strains encountered in log debarking.

Proper debarking requires a fixed positioning of the tool cutting edge relative to the log, yet the severe loads require a resiliency and flexibility in the mounting. I have devised a mount that meets these requirements. The mounting constructed in accordance with my invention continuously positions the tool in its proper position with respect to the log, that is, does not permit the tool to move out of position either laterally or longitudinally of the log, yet has the needed flexibility and resiliency. With mountings constructed in accordance with my invention the needed flexibility is assured. With my mounting the loads applied such as shock loads when striking projections or obstructions can be accommodated by deflection of the tool unit with respect to the log. Once the obstructions have passed, the tools will return to their original positions.

Since the tool is connected to a piston movable in a cylinder mounted on the rotatable "ring" of a debarker such as disclosed herein it is desirable to construct the tool and operator (piston-cylinder) so that they constitute a single replaceable unit. By so doing the entire tool unit can be removed for adjustment or repair and a standby unit inserted in its place considerably reducing the shutdown time of the debarker. A still further object of the invention therefore is to provide a practical mounting for the whole tool unit which will withstand the shock loads referred to above, properly position the tool itself (knife or peeler) and yet which will make it possible to quickly and easily replace the tool units.

Yet another object of the invention is to provide a resilient tool-unit mounting in which the resilient elements can be readily replaced without extended shutdown periods. According to the invention both the tool unit and the resilient mounting can be quickly replaced.

Additional objects of my invention include, to provide a tool mounting which can be simply constructed, which is reliable, which will not fail in service, yet which can be readily replaced or removed if necessary.

These and other objects and advantages will become apparent from the following description and the accompanying drawings in which.

Similar reference characters in the several views indicate similar parts.

Figures 1, 2, 2A, 2B, 3, 4:
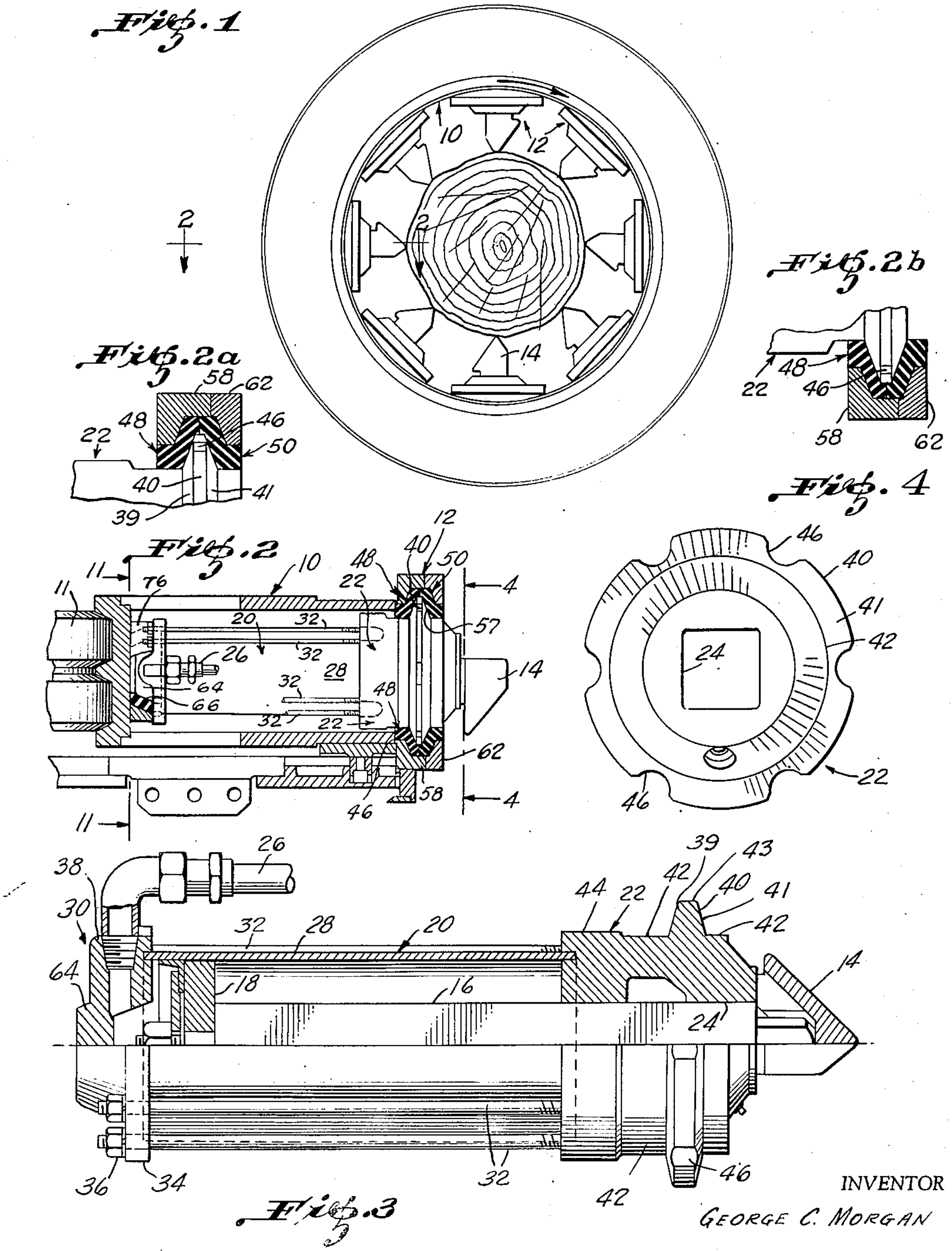
Figure 1 is a fragmentary end elevation of a portion of a log-debarker apparatus and illustrates the relative positions of tool mountings constructed in accordance with the invention.
Figure 2 is a fragmentary section taken along line 2—2 of Fig. 1 and illustrates a tool unit positioned in the debarker rotor as well as portions of a stator that guides the rotor.
Figure 2A is a blowup of a portion of Fig. 2 as indicated in Figure 2.
Figure 2B is, as indicated in Fig. 2, a blowup of a portion of Figure 2.
Figure 3 is an enlarged-scale view partly in section and illustrating details of the tool unit shown in Figure 2.
Figure 4 is an enlarged-scale end elevation of an inner cylinder head forming part of the apparatus as viewed in the direction indicated by line 4—4 in Figure 2 with some elements deleted.

As pointed out above this invention relates to an improved tool mounting used in log debarkers. The mounting, however, may be used for other purposes. The mounting disclosed herein is used where radially disposed tools are required to press against an irregular object like a log and rotate relative the object. The tools may strike irregular surfaces on the log, for example, at high speeds. Thus they must either be extremely strong and strongly mounted in order to overcome the obstruction by tearing it away or they must be flexibly mounted to give under pressure and pass over the obstruction without damage to the tool and its mounting. The flexible mounting, of course, must have the resiliency required to return the tool to a proper preset relationship with respect to the work.

My invention discloses a method of mounting the tool assembly to permit flexibility, yet which is resilient in that the tool will return to its original position. One reason for preferring a flexible resilient construction instead of an extremely strong and rigid one is due to the limitation of space in the rotating tool support or ring. Further, it is desirable to keep the inertia of the rotating elements as low as possible. Thus, any saving in weight operates to advantage. A flexible and resilient tool mounting makes it possible to reduce the size and weight without increasing the likelihood of structural failure.

Referring now in particular to the drawings the log debarker comprises a rotatable ring 10. The ring 10 can rotate in the direction indicated by the arrow in Figure 1. Rollers 11 rotatably support the ring, as is well known in the art. Tool assemblies 12 are mounted at equally spaced points on the ring 10. The tools are more fully illustrated in Figures 2 and 3 which show that a tool head 14 is connected to a piston rod or tool arm 16. The piston rod in turn is connected to a piston 18 which operates in a cylinder 20. An inner cylinder head 22 has a squared opening 24 for cooperating with the tool arm. Thus the arm and tool head cannot rotate in the cylinder. A fluid conduit 26 is connected to an outer head 30 of the cylinder and fluid under pressure is admitted by suitable controls to advance the tool head against the log.

It is obviously desirable to accommodate as many sizes of logs as possible in one machine. The maximum size of the log is limited by the maximum amount that the tool heads can be withdrawn into the cylinders. The minimum log is determined by the maximum amount that the heads can be moved toward the center of the machine. Thus, in other words, the travel of the tool heads determines the range of the machine. The travel of the piston is, therefore, of importance and it is important that the cylinder be as long as possible. Of course the overall size of the machine and the inertia of the moving parts must also be considered as indicated above. Therefore, it is desirable to obtain greatest travel with the size of pistons and cylinders that can be accommodated. According to the invention the interior of the cylinder is clear for travel of the piston the full length of the cylinder, yet, the heads provide adequate support and are maintained at a minimum size. Further, air is introduced through the head 30 at the outer end of the cylinder further insuring maximum travel of the piston.

The cylinder comprises an outer shell or wall 28. The latter is connected at its inner end to the cylinder head 22 and at its opposite end to the cylinder head 30. Bolts 32 are threaded into the head 22 and project through a flange 34 on the head 30. Nuts and washers 36 cooperate with the rods to maintain the wall 28 in compressed sealed relationship with the cylinder heads. The wall 28 is received in grooves in the cylinder heads and sealing means can be placed in the grooves. The head 30 has a tapped boss 38. The latter is adapted to be connected to the fluid line 26 and the interior of the head 30 is bored to transmit the fluid into the cylinder.

The cylinder head 22 has a circumferential flange 40 which has tapering outer and inner sides 39 and 41. The flange 40 projects radially outwardly from a cylindrical surface 42. The latter is depressed with respect to a surface 44. The flange 40 has a series of spaced semicylindrical indentations 46.

Figures 5, 7:
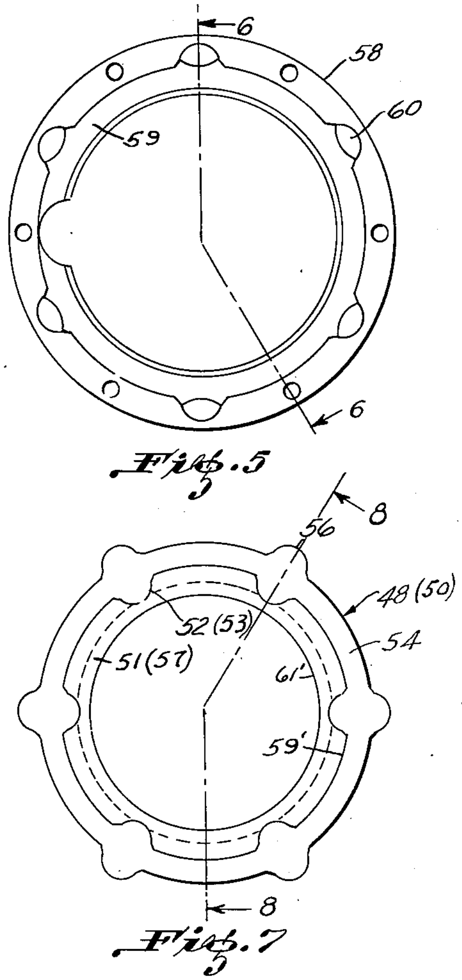
Figure 5 is an end elevation of a front support mount for the tool assembly of Fig. 3.
Figure 7 is an end elevation illustrating a resilient support element adapted to cooperate with the elements illustrated in Figs. 4 and 6 in supporting the tool unit of Figure 3.
Figure 6:
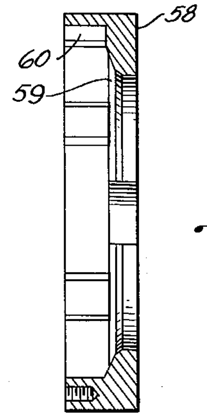
Figure 6 is section taken along line 6—6 of Fig. 5.
Figure 8:
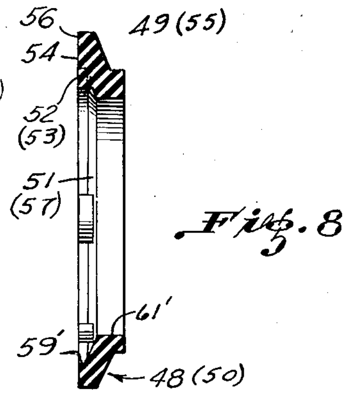
Figure 8 is a section taken along line 8—8 of Fig. 7.
Figure 9:
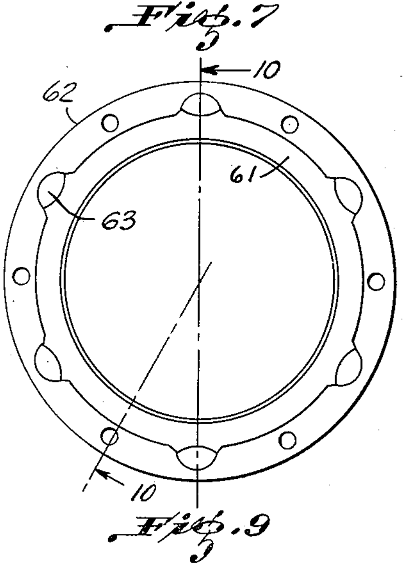
Figure 9 is an end elevation of a support cap which cooperates with the elements illustrated in Figs. 4 to 8.
Figure 10:
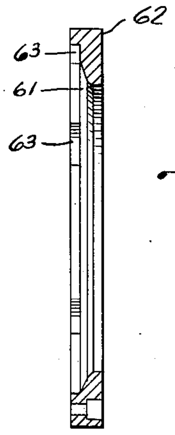
Figure 10 is a section taken along line 10—10 of Fig. 9.
Figure 11:
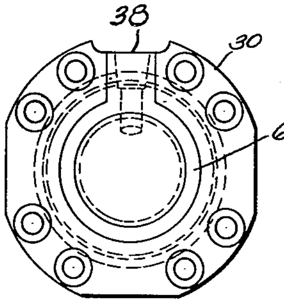
Figure 11 is an end elevation of a cylinder head forming part of the unit shown in Figures 2 and 3 as viewed in the direction indicated by line 11—11 in Figure 2. Some elements are not shown in order to improve the disclosure.
Figures 12, 13:
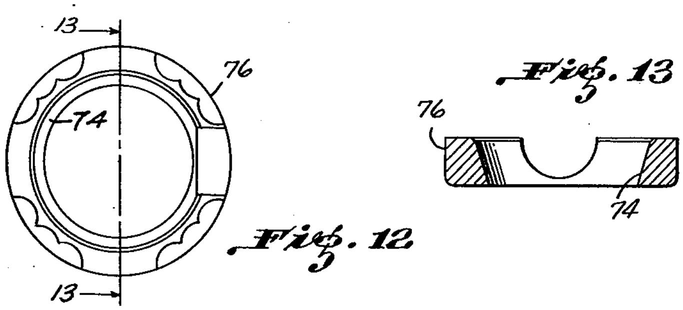
Figure 12 is an end elevation of a support cap adapted to cooperate with the cylinder head illustrated in Fig. 11.
Figure 13 is a section taken along line 13—13 of Fig. 12.
Figure 14:
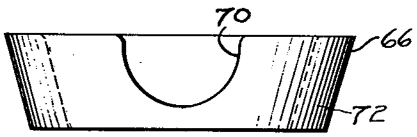
Figure 14 is a top plan view of a resilient support element associated with the elements illustrated in Figs. 11 and 13.
Figure 15:
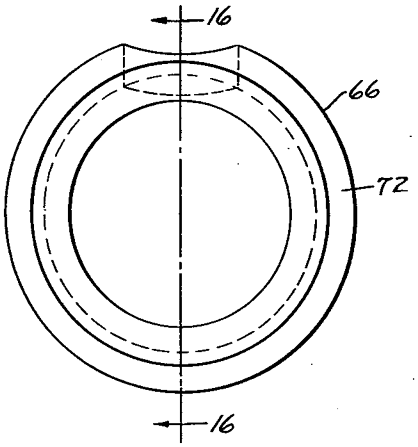
Figure 15 is an end elevation of the element illustrated in Fig. 14.
Figure 16:
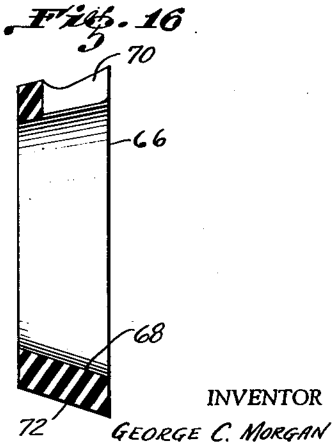
Figure 16 is a section taken along line 15—15 of Fig. 14.
Figure 17:
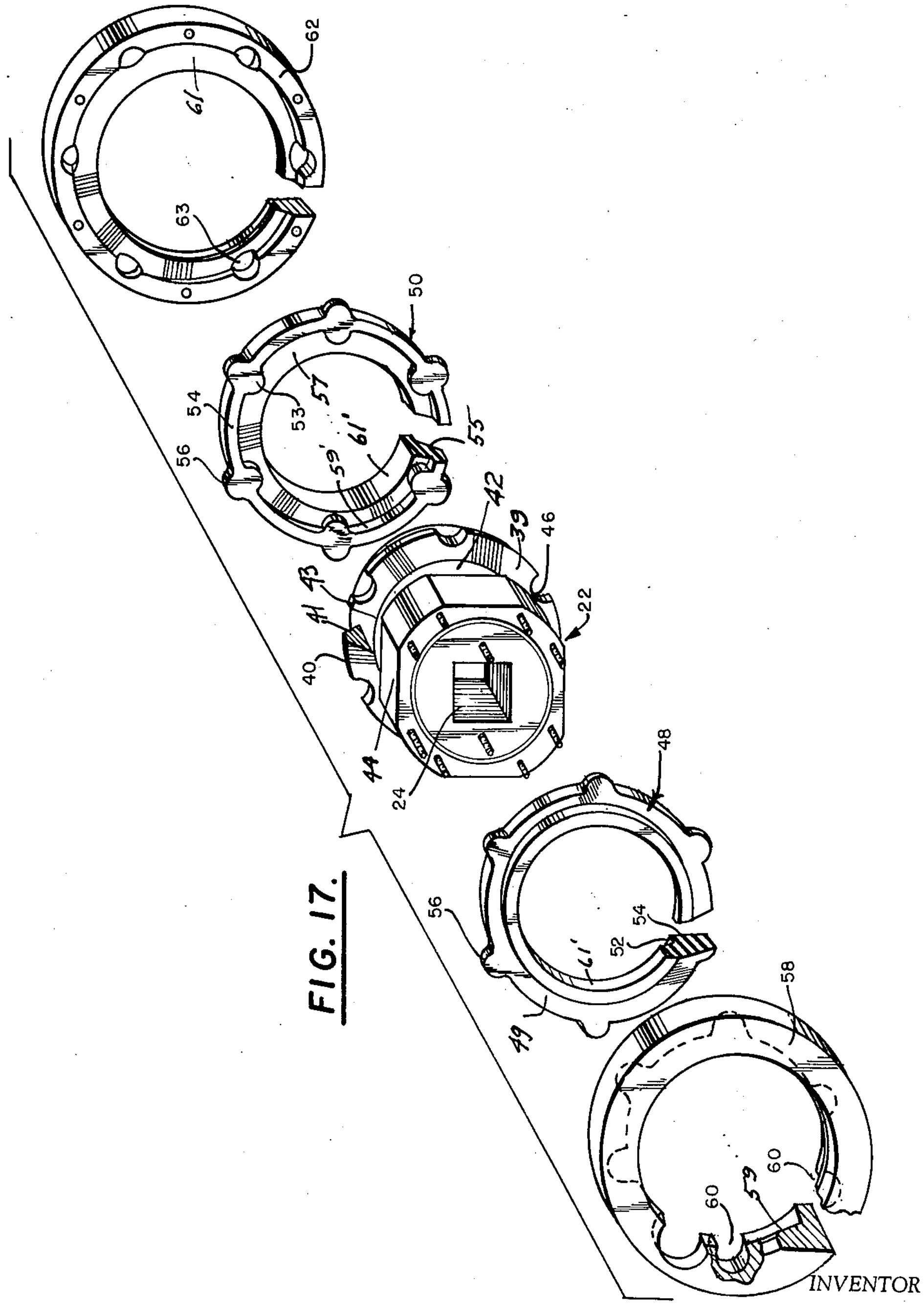
Figure 17 is a perspective view showing the relationship and construction of elements constituting the supporting means for the inner end of the tool unit. The scale chosen is that which provides the best illustration within the limitations of the sheet on which the figure appears.
Figure 18:
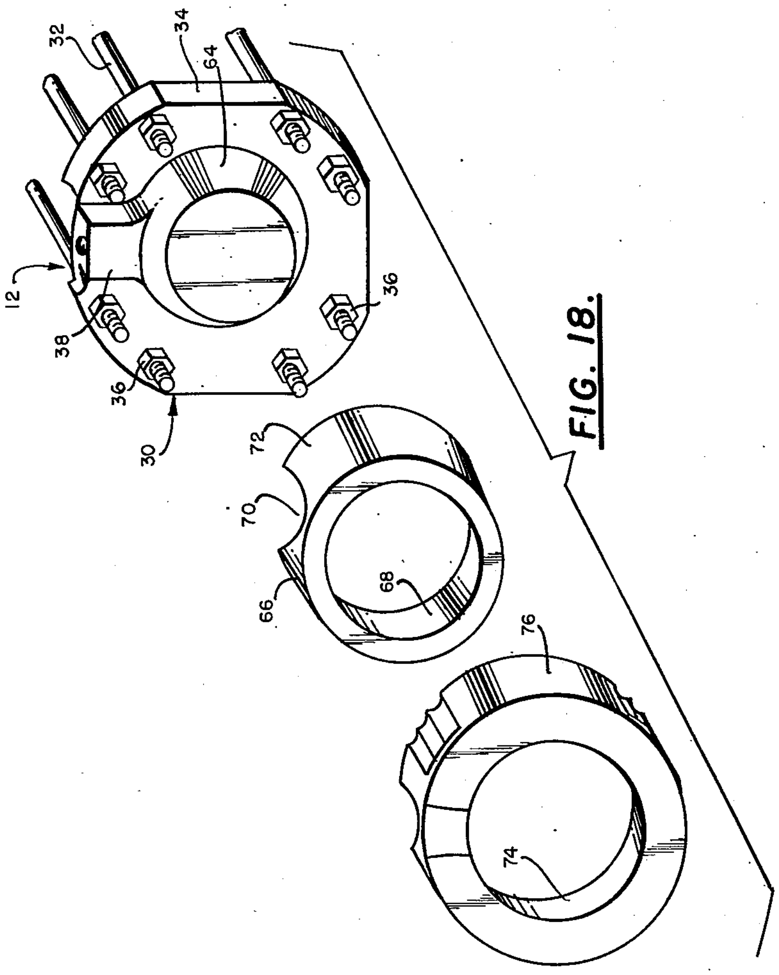
Figure 18 is a perspective view showing the relationship and construction of elements constituting the supporting means for the outer end of the tool unit, and the scale chosen is that which provides the best illustration within the limitations of the sheet which the figure occupies.

A resilient support element 48, which cooperates with the inner cylinder head 22 in supporting the tool assembly 12 is formed complementary to one side 39 of the flange 40 and to the surface 42. The support element 48 is made of resilient material such as rubber, and has spaced inward semicylindrical projections 52 (see Figs. 7 and 8), which cooperate with indentations 46. Another support element 50 (see Fig. 17) is a duplicate of the support element 48 and contacts the other side 41 of the flange 40 and surface 42. The element 50 also has interior projections 53 which seat in the indentations 46. The two elements 48 and 50 have abutting faces 54. When assembled the support elements completely surround the flange 40 and also surround the surface 42 adjacent the flange 40. Both support elements have a series of outer semicylindrical projections 56 which are aligned when the interior projections 52 and 53 seat in the indentations 46. The projections 56 are on the outer peripheries of the support elements 48 and 50 in the illustrated embodiment. The projections cooperate with an inner cylinder support mount 58 which is preferably attached to the ring 10 by welding. (See Figs. 2, 5, 6 and 17). The mount 58 has depressions 60 formed complementary to the projections 56. A cylinder support cap 62 (see Figs. 2, 9, 10 and 17) cooperates with the cylinder support mount 58 and is bolted thereto. The cap 62 has depressions 63 formed complementary to the projections 56 of the elements 48 and 50. The depressions 63 are aligned with the depressions 60 and portions of the outer projections 56 extend outwardly of the depressions 60 and into the depressions 63 when the elements are assembled (see Fig. 2).

The outer cylinder head 30 has a conically shaped flange 64 broken only by the boss 38. A resilient mounting element 66 for the outer cylinder head 30 is formed of flexible resilient material such as rubber or synthetic rubber (similar to the inner support elements 48 and 50). The outer mounting element is conically shaped complementary to the flange 64 to provide an interior surface 68 and has a boss-receiving opening 70. The mounting element 66 has a conically shaped exterior surface 72. The latter seats in a conical bore 74 formed in an outer cylinder support mount 76. The mount 76 cooperates with the outer head 30 in supporting the tool assembly 12.

The inner cylinder support mount 58 and outer cylinder support mount 76 are preferably secured to the rotatable ring 10, as by welding. The two mounts are fixed so as to be aligned radially of the central axis of the debarker. Thus, each tool unit, when mounted in the above-described supporting means, is positioned so that the knife 16 can be moved perpendicularly to the work axis in a manner similar to that in which a tool on a lathe with a straight cross feed can be moved perpendicularly of the work.

In assembling the tool unit 20 in the ring 10 the outer resilient mounting element 66 is placed on the outer cylinder head 30 and the resilient inner support elements 48—50 are placed on the inner cylinder head 22. Next the tool unit with the mounting elements in position is inserted into the ring 10 and the outer and inner resilient mounting elements aligned with the outer and inner cylinder support mounts 76 and 58. Then cap 62 is placed over the resilient support element 50 and drawn up tight by means such as nuts and bolts. When the cap is drawn up tight the resilient mounting elements are placed in compression and are in intimate contact with their mating elements. The fluid line 26 can then be connected. The removable front cap 62 locks the tool assembly in position.

The two resilient members 48 and 50 form a ring which surrounds the flange 40 and together with the element 66 resiliently maintain the tool unit 20 in proper position.

The support mount 58 has a tapered inner wall 59 which bears against a tapered outer wall 49 of the resilient support member 48, and member 48 has a tapered inner wall 51 which bears against the tapered side 39 of the flange 40 when the elements are assembled, as in Fig. 2. Similarly the resilient support member 50 has an inner tapered wall 55 which bears against the tapered wall 61 of cap 62, and an outer tapered wall 57 which bears against the side 41 of the flange 40 when the elements are assembled as illustrated in Figure 2. Walls 59' of resilient members 48 and 50 contact the outer cylindrical surface 43 of the flange 40, and the confronting faces 54 of the resilient members abut each other when assembled. Surfaces 61' of the resilient members 48 and 50 each define an inner cylindrical longitudinal bore and seat on the cylindrical surface 42 of the cylinder head 22 on opposite sides of the flange 40.

The resilient mounting thus providing has been proved to meet the support requirements for the debarking tools. The inner support resists turning movement and together with the outer support resists longitudinal movement. Yet the tool unit can deflect under shock loads.

An important advantage of the construction is that both the tool unit and the resilient elements can be quickly removed for examination or replacement.

While I have shown and described a preferred form of my invention, it will be understood that variations in details of form may be made without departure from the invention as defined in the appended claims.

I claim:

1. In log-debarking apparatus, a debarking-tool assembly comprising a cylinder and a tool, said cylinder having heads at opposite ends thereof, one of said heads having a square opening and a squared piston rod connected to said tool and slidably received in said squared opening and preventing rotation of said tool with respect to said head, means for supporting said assembly comprising a conically shaped flange on one of said heads, a resilient member surrounding and receiving said flange and a support surrounding and receiving said resilient member, the other of said heads having a peripheral flange, means forming peripheral indentations on said peripheral flange, a resilient support means for said peripheral flange comprising facing supporting elements having a common mating surface and each receiving a portion of said peripheral flange, spaced projections in both of said elements and projecting into said peripheral flange, spaced projections on the exterior of both of said elements, a support member receiving both of said elements, said support member having means cooperating with the exterior projections on said elements and maintaining said projections in fixed relationship with said support member, and a cap cooperating with said support member and contacting one of said elements, said cap maintaining said elements in compression, said last-named means and said cap functioning to maintain said elements in fixed relationship to said support member and said cap.

2. In a log-debarking apparatus, a rotatable ring adapted to receive a log, debarking tools supported in said ring and adapted to engage such a log, means for supporting each of said tools comprising a support element secured to said ring, said support element having a conically shaped inner surface, a second support element mounted in said ring and having a generally cylindrically shaped inner surface, the axis of the inner surface of both of said elements being in longitudinal alignment, a tool assembly having a conically shaped end adapted to be received in the conically shaped inner surface, and a resilient member interposed between said conically shaped surface and said conically shaped end, said tool assembly having a circumferential projection adjacent its opposite end, a resilient member formed complementary to said projection and received in said cylindrical surface, said resilient member projecting outwardly of said second mentioned support element, and a support cap connected to the last named support element and bearing against the last named resilient member, means urging said cap toward said last named support member and forcing said resilient members each against their associated support member.

3. A log-debarking apparatus comprising a rotatable ring adapted to receive a log, tool assemblies mounted in said ring and rotatable therewith and adapted to remove bark from such a log, means for mounting each of said tool assemblies comprising an outer support element connected to said ring and having a conically shaped bore, an inner support element connected to said ring and having a cylindrically shaped bore, the axis of the bore of said inner element being in alignment with the axis of the bore of the outer element, said tool assembly having a conically shaped end received in the conically shaped bore of said outer element and a resilient member interposed between the conically shaped bore and said conically shaped end, said tool assembly having a laterally projecting flange and resilient means receiving said flange and received in said cylindrical bore and disposed between said flange and said inner support element bore, a cap contacting the last named resilient means, and means for urging the cap toward said inner support member, the last named means maintaining both said resilient elements in compression.

4. The apparatus of claim 3 in which the resilient means receiving said flange is formed in two parts, one of which abuts one side of said flange and the other of which abuts the other side of said flange, and said parts contacting each other along surfaces extending adjacent said flange.

5. The apparatus of claim 4 in which said resilient means receiving said flange has laterally extending projections on its outer surface and laterally extending projections on its inner surface, said inner support member and said cap having depressions receiving the projections on said outer surface, and said flange having depressions receiving the projections on said inner surface.

6. In a log-debarking apparatus, in combination, a debarking-tool assembly comprising a cylinder and a tool, a piston rod connected to said tool, said rod being slidable in said cylinder, means preventing rotationable movement of said rod relative to said cylinder, means for supporting said assembly comprising a conically shaped flange formed on said cylinder, a resilient member surrounding and receiving said flange and a support means surrounding and receiving said resilient member, a second flange formed on said cylinder and spaced longitudinally of said cylinder from the first-mentioned flange, means forming peripheral indentations on said second flange, a resilient support means for said second flange comprising facing supporting elements having common mating surfaces and each receiving a portion of said second flange, first spaced projections on both of said elements, said projections projecting into said indentations in said second flange, second spaced projections on both of said elements, a support member receiving both of said elements, said support member having indentations cooperating with said second projections on said elements and receiving said second projections, and means maintaining said elements and said resilient member in compression.

7. In a log-debarking apparatus, in combination, a debarking-tool assembly comprising a debarking tool, a motor, means connecting said motor to said tool, said motor being operative to advance said tool in a substantially straight line of movement, means preventing rotationable movement of said tool relative to said motor, means for supporting said assembly comprising a first flange connected to said assembly, a resilient member surrounding and receiving said first flange, a support surrounding and receiving said resilient member, a second flange connected to said assembly, a second resilient member surrounding and receiving said second flange, said second resilient member and said second flange having mating portions shouldered laterally of said line of movement, means forming spaced projecting portions on the exterior of said second resilient member, a second support, said second support having indentations receiving said projecting portions, said indentations and said projecting portions being shouldered laterally of said line of movement, a cap member, said cap member being in facing relationship with said second support, means urging said cap member toward said second support and urging said cap member against said projecting elements and forcing said second resilient member and said tool assembly toward the first mentioned resilient member and placing both of said resilient members in compression.

8. The combination of claim 7 wherein said projecting portions of said second resilient member extend outwardly of said indentations, said cap having indentations receiving the extending parts of said projecting portions.

9. The apparatus of claim 7 wherein said second resilient member and said second support are ring shaped and said second support has a cylindrical pocket receiving a substantial part of said second resilient member.

10. The apparatus of claim 7 wherein said second resilient member is formed of a first element and a second element, the first element being positioned on one side of said second flange and the second element being positioned on the opposite side of said second flange, and both of said elements extending between said flange and said second support.

11. The apparatus of claim 10 wherein said second resilient member elements have mating facing flanges positioned adjacent said second flange, said mating facing flanges being urged into contact with each other by said cap.

References Cited in the file of this patent

UNITED STATES PATENTS

| | | |
|---|---|---|
| 1,971,417 | Kingston et al. | Aug. 28, 1934 |
| 2,099,172 | McCabe et al. | Nov. 16, 1937 |
| 2,136,268 | Watts | Nov. 8, 1938 |
| 2,313,916 | Bone et al. | Mar. 16, 1943 |
| 2,623,558 | Andersson | Dec. 30, 1952 |

FOREIGN PATENTS

| | | |
|---|---|---|
| 439,817 | Great Britain | Dec. 16, 1935 |